United States Patent [19]

Padawer et al.

[11] Patent Number: 5,124,989
[45] Date of Patent: Jun. 23, 1992

[54] METHOD OF DEBUGGING A COMPUTER PROGRAM

[75] Inventors: Andrew D. Padawer; Jan de Rie, both of Redmond; David T. Jones, Preston, all of Wash.

[73] Assignee: Microsoft Corporation, Redmond, Wash.

[21] Appl. No.: 462,500

[22] Filed: Jan. 8, 1990

[51] Int. Cl.$^5$ .............................................. G06F 11/00
[52] U.S. Cl. ................. 371/19; 364/DIG. 1; 364/267.91; 395/575
[58] Field of Search ................ 371/16.1, 19; 364/200, 364/267.8, 267.91

[56] References Cited

U.S. PATENT DOCUMENTS

| | | | |
|---|---|---|---|
| 3,551,659 | 12/1970 | Forsythe | 371/19 |
| 3,937,938 | 2/1976 | Matthews | 371/19 |
| 4,429,368 | 1/1984 | Kurii | 371/19 |
| 4,598,364 | 7/1986 | Gum et al. | 371/19 |
| 4,783,762 | 11/1988 | Inoue et al. | 364/900 |
| 4,819,234 | 4/1989 | Huber | 371/19 |
| 4,872,167 | 10/1989 | Maezawa et al. | 371/19 |

Primary Examiner—Charles E. Atkinson
Attorney, Agent, or Firm—Seed and Berry

[57] ABSTRACT

A method and system for recording debug commands as they are executed on a program is disclosed. The line number in the program reached after executing the debug command is also stored on the tape. The debug history tape is a sequential record of the debug commands. A user may reexecute one or more of the debug commands on the program by running the debug history tape. The user may stop the reexecution of the debug commands on a given line in the program generally in the area thought to contain the error, by moving an ending pointer to that region in the debug history tape. The tape will execute up to the ending pointer and then stop. The user may then examine the program, execute additional debug commands or take other action to locate the error. Any additional debug commands are also stored on the tape. The ability to reexecute the debug commands and stopping their execution at selected lines in the program aids the user in locating errors. After locating the errors, the user modifies the program. The user may then reexecute the same debug commands on the modified program to ensure that the error has been corrected.

19 Claims, 6 Drawing Sheets

METHOD OF DEBUGGING A COMPUTER PROGRAM

DESCRIPTION

1. Technical Field

This invention is related to a method and system for locating and correcting errors in a computer program and, more particularly, to a method of recording debug commands as they are executed on said program and permitting reexecution of the same debug commands on the program at the request of a user.

2. Background of the Invention

New programs created by a user often include one or more inadvertent errors. Locating and removing the errors in a program is generally known in the industry as "debugging" the program (errors being referred to as "bugs").

Debugging a program can be difficult and time-consuming. In the prior art of debugging a program, a user may first read the program line-by-line to try and locate the errors. Following the flow of a program by reading it line-by-line is difficult, even in a relatively simple program. If the program contains many loops, subroutines based on variables, or calls, the user may not be able to trace the sequence of execution, and hence the function of each line.

A prior art product sold under the name CODE-VIEW ™ Version 1.0 and 2.0 by Microsoft, owners of this invention, includes a number of aids to help the user in debugging the program. A user may execute one or more debug commands on the program and observe the results as an aid to locate and correct the error. For example, a breakpoint may be set in the program to halt execution whenever the line on which breakpoint is set is encountered. The values of variables may be displayed in a window as the program executes to permit the user to monitor them. Additionally, the program may be executed one line at a time and the function performed by each line observed. Many other debugging commands are provided as tools to the user by the prior art software CODEVIEW ™ to aid him in locating and correcting errors in the program.

Even with CODEVIEW ™, debugging a program can be difficult and time consuming, depending on the type of error and type of program. Some programs perform numerous iterations through one or more loops based on different variables. The first few times (or thousands of times) the program steps through the loop, execution may proceed seemingly smoothly because the variables are within an acceptable range of values. However, one variable may become an unacceptable value on the tenth (or one thousandth) iteration of the loop, creating an error and causing the program to crash. Locating such an error, even with CODE-VIEW ™ is very difficult After an error is located, the program is usually modified to correct the error. Unfortunately, the modification may fail to correct the error or additional errors may exist. Ensuring that the modification corrected the error may be just as time consuming as locating the error initially. Locating additional errors in the program will likely be just as time consuming as locating the first error.

SUMMARY OF THE INVENTION

It is therefore an object of this invention to store a record of all debug commands executed on a program to facilitate locating and ensuring correction of errors in the program.

It is another object of this invention to permit repeated, identical execution of a sequence of debug commands on a program to observe the program response, both before and after modifying the program.

These and other objects of the invention as will be apparent herein are accomplished by storing debug commands on a tape as they are executed on a program. The line number in the program reached after executing the debug command is also stored on the tape The debug history tape is a sequential record of the debug commands. A user may reexecute one or more of the debug commands on the program by running the debug history tape. The user may stop the reexecution of the debug commands on a given line in the program generally in the area thought to contain the error, by moving an ending pointer to that region in the debug history tape The tape will be executed up to the ending pointer and then stop. The user may then examine the program, execute additional debug commands or take other action to locate the error. Any additional debug commands are also stored on the tape. The ability to reexecute the debug commands and stopping their execution at selected lines in the program aids the user in locating errors After locating the errors, the user modifies the program. The user may then reexecute the same debug commands on the modified program to ensure that the error has been corrected.

DETAILED DESCRIPTION OF THE INVENTION

Figure 1:
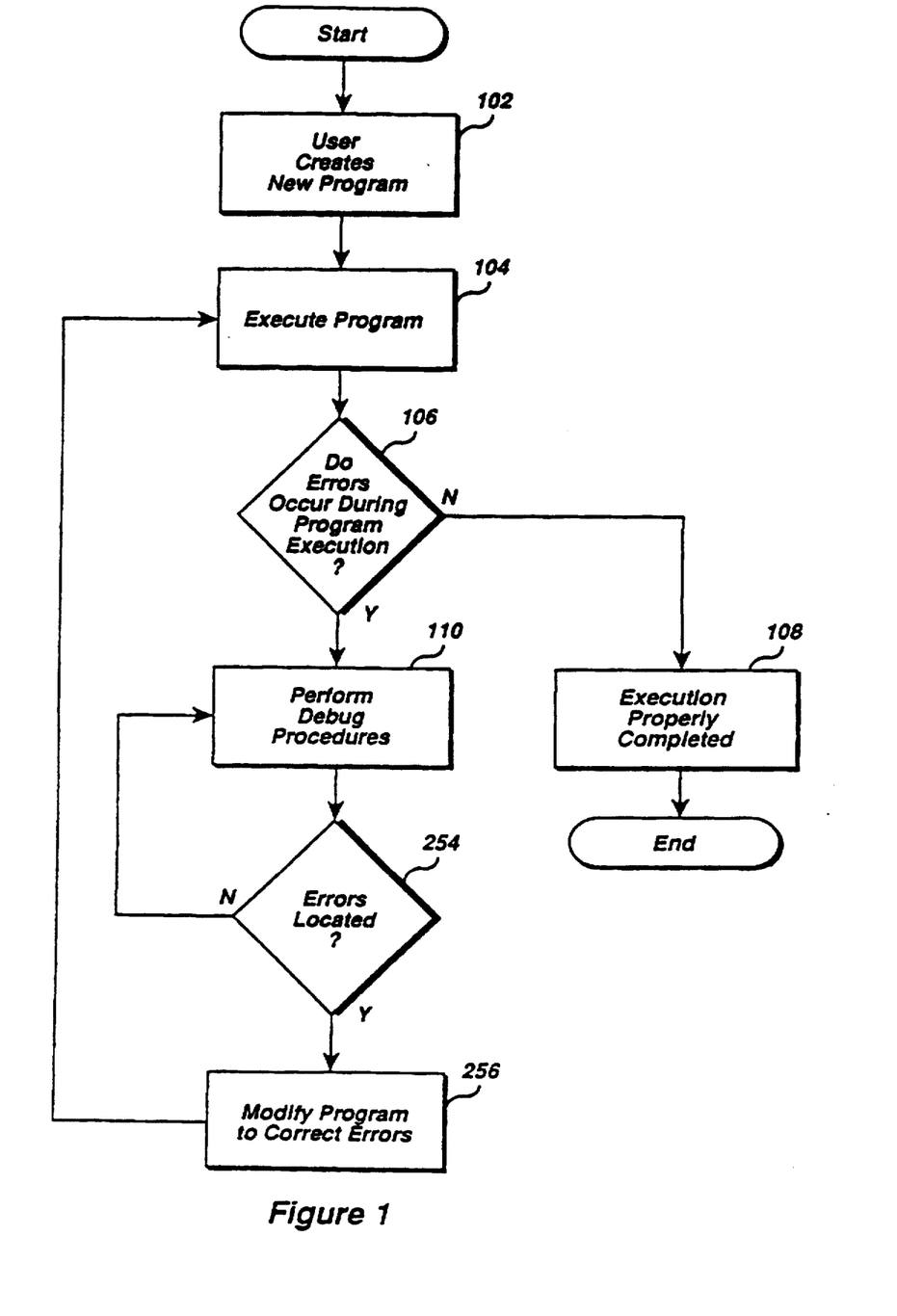
FIG. 1 is a flow chart of a software program for carrying out the invention.

There are three basic steps to create a useable program: conceptualize the function of the program, write computer readable lines of code, and debug the program. FIG. 1, step 102, illustrates the first two steps in creating a new program. This invention, and remaining steps in the flow charts deal with the last step of creating a program, namely, debugging the program. As a first debug step, part or all of the program is executed, step 104, on a computer. If the program executes properly, that is, if no errors occur during execution, the "NO" branch is selected in step 106 and execution is properly completed, step 108 Unfortunately, the newly created program may contain one or more inadvertent errors. (If the program is large or complex, it will likely contain inadvertent errors.) If errors are present, the "YES" branch is selected in step 106.

The user performs debug procedures, step 110, looking for errors. If an error is located, step 254, he modifies the program to correct the errors, step 256. After modifying the program in an attempt to correct the errors, the user returns to step 104 and executes the program again. Steps 104, 106 and 110-256 are repeated as many times as necessary to correct all the errors and achieve proper execution, step 108 Debugging the program may take as long as writing the code if the program execution is complex.

Figure 2:
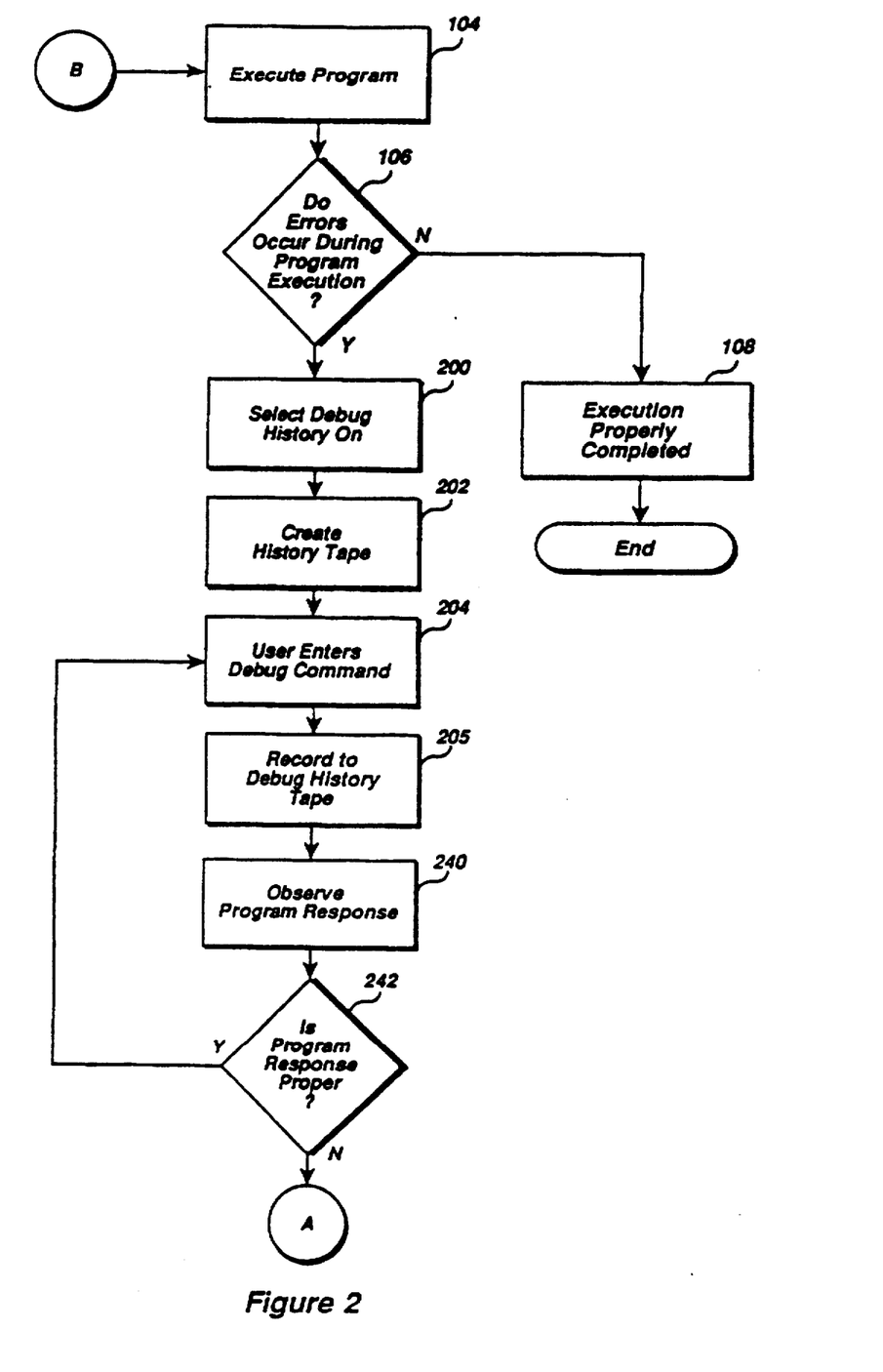
FIGS. 2 and 3 are a more detailed flow chart of the software program of FIG. 1.
Figure 3:
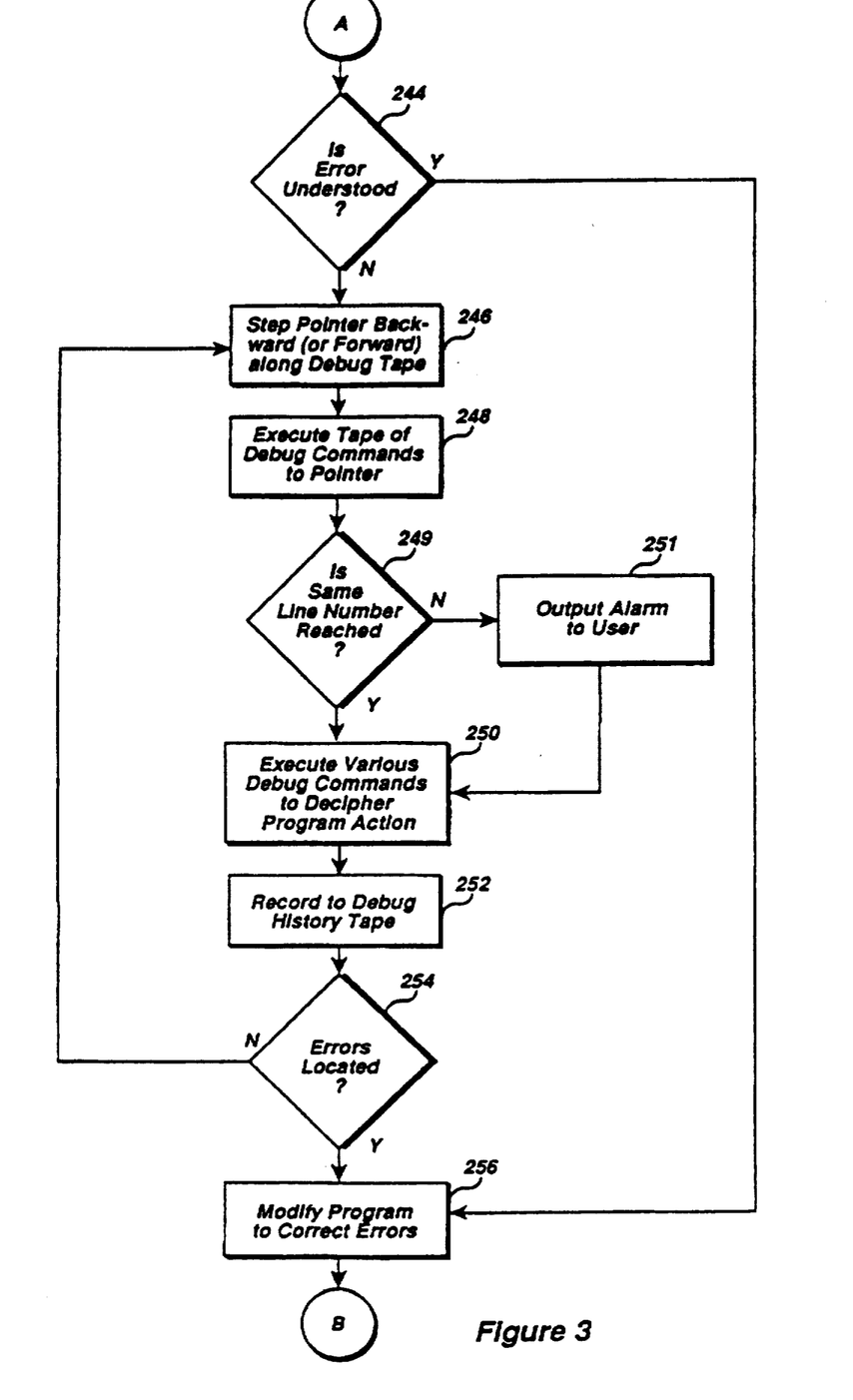

FIGS. 2 and 3 illustrate detailed steps in the debugging procedure. When the program fails to execute properly and the existence of program errors is confirmed, a user begins the debug procedure, step 110 of FIG. 1. (Identical reference numbers in FIGS. 1–4 correspond to identical steps.) Steps 200–252 are part of step 110 of FIG. 1. A user may begin the debug procedure by displaying the code on his screen or printing out a hard copy and reading it carefully If a reading of the code does not reveal any errors, the user debugs the program with his computer using the invention. According to the invention, the user selects the debug history to be "ON," step 200. With the debug history on, a debug history tape is created, step 202. The tape is a sequential script of the debug procedures. After the user enters a debug command, step 204, a record of the command is created and stored and, if the command is one which executes a line in the program, a record of the line number arrived at in the program is created and stored as a history point record.

The user uses one or more of a variety of debug commands in step 204. He selects from the many available to him to aid him in locating and correcting the errors. For example, the user may set a breakpoint on a line in the program. The affect of a breakpoint is that whenever the program encounters this breakpoint line, execution stops and does not continue until the user continues it. The user may thus observe program execution up to and at the breakpoint. He sets as many breakpoints as desired throughout the program. Other debug commands which a user may execute include: a step command in which the program is executed one line at a time with the lines being displayed to the user as they are executed; a trace command to trace the execution of a program step; a watch value command to provide display to the user of a selected value while the program executes; a watchpoint command to stop the execution of the program upon the occurrence of a user-selected condition, such as a variable being equal to a selected value; an animation command to rapidly step through the program execution; an assign command to assign a user-selected value to a variable; or the like. Executing debug commands on a program and numerous different commands are known in the prior art. The prior art debugging program CODEVIEW ™ contains many of the above commands. Various other debug commands now known or developed hereafter may be used as tools on the program as part of this invention.

A record is created and stored on the history tape for each debug command executed (Step 205, explained in more detail elsewhere herein.). The user observes the program response after each debug command, step 240. If the program response is proper, a "YES" in step 242, that is if no errors occur, the user returns and enters a new debug command, repeating step 204. A new record is created and stored on the tape, step 205. The loop of steps 204–242 continues by sequentially storing debug commands at the tail of the history tape.

As an example of a debug procedure and the tape created, assume the user begins by setting a breakpoint. The user then executes the following commands: two continues, a step, a trace, a watchpoint, a step, a breakpoint, three continues and a trace. The user then observes a program response that is not proper.

A debug tape was created in step 202 and records stored in step 205. Each record was stored sequentially, one after the other, as the respective debug command was executed on the program. The records may each have a different number of bytes and debug command records are intermixed with filename records, history point records, and other records. The history tape created is thus a series of sequential bytes making up records of variable length, each record possibly having different contents.

The bytes as stored on the tape in the above example appear to the computer as a continuous sequence of bytes, something like this:

XXXXXXXXXXXXXXXXXXXXXXXXXXXX-
XXXXXXXXXXXXXX
XXXXXXXXXXXXXXXXXXXXXXXXXXXX-
XXXXXXXXXXXXX
XXXXXXXXXXXXXXXXXXXXXXXXXXXXX
. . . (Example 1)

where each X represents one byte of any value. There are no flags or special characters to mark the beginning or ending of each record other than the bytes storing the command.

If letters and numbers are substituted for an X (where the value of the byte is known, based on the above example of debug steps) the same tape looks something like this to a user:

F#X
X#BXXX5C2HXXX5C2HXXX5S2HXXX5F#X . .
. X#T
2HXXX5W#X
X#S2HXXX5BXXX5C2HXXX5C2H
XXX5T2HXXX5 . . . (Example 2)

where a letter is the first byte in each record, the identity of the letter corresponding to the stored debug command; a number is the number of bytes in a record, a # being an unknown number; and an X being one byte of any value.

The first byte in each record represents the debug command stored. The last byte in the record provides the total number of bytes in that record. The number of bytes between the first and last bytes varies with the debug command and in some commands is a variable. The records for the continue, step, trace, and exit commands are only 2 bytes, the command itself being the first byte and the number of bytes in the record, 2 being the last byte. The records for a history point, breakpoint on and breakpoint off are five bytes, the first byte being the command itself, the next three bytes providing the file name and line number of the line affected by the command and the last byte being a 5, because there are a total of 5 bytes in the record. The record for a file name, watchpoint on, watchpoint off, and assign are of variable length. The first byte is the debug command itself, the next byte is the length of the string following in the record, the next bytes contain the data provided by the user or the file name and the last byte is the total number of bytes in the record. The name for a file is previously selected by a user (it may be implied from the source file name), and thus may range from a few to many bytes. Similarly, watchpoint and assign debug commands are input by a user and thus are of any length as determined by the user.

If each record in the above tape is separated by a / to make the record easier for a user to understand, the tape may look something like this:

F#X
X#/BXXX5/C2/HXXX5/C2/HXXX5/S2/HXXX-
5/F#

X . . . X#/T2/HXXX5/W#X . . .
X#/S2/HXXX5/BXXX5/C2/H
XXX5/C2/HXXX5/C2/HXXX5/T2/HXXX5/
. . . (Example 3)

(The / is not a byte in the tape and is merely provided to aid the reader in seeing the separation between one record and the next.) The first record, F#X . . . X#, is identified by the first letter, F, as a file name. The next byte in this record is a number, #, which is the total number of bytes in the specified file name. The last byte, #, is a number listing the total number of bytes in the record. In addition to the debug commands themselves, the history tape includes other records to permit each debug step to be precisely reproduced. Certain records refer to file names and line numbers, such as breakpoint records, history point records and the like. Rather than store the entire file name in each such record, the file name is stored once in the tape. An index byte corresponds to that file name. The index byte is stored in such a record to indicate the file, thus avoiding the need to repeat the same file name many times. The first record in Example 4 is an entire file name stored as a record in the tape. When the same file name is referred to in another record, a single index byte which refers to this file record is used.

In this example, the second record, BXXX5, is identified by the first letter B as a breakpoint debug command. The next three bytes, XXX, provide the file name and line number of the breakpoint in the program, and the number 5 provides the total number of bytes in the record, 5. Because the tape is recorded in the same sequence as the debug commands are executed, setting a breakpoint at a given line number in a given file was the first debug command executed by a user on this program in this example.

The next record, C2, is identified by the first letter as a continue debug command and by the last number as having 2 total bytes in the record. It was the second debug command executed by the user.

The next record is a history point record, HXXX5 where H is the history point record indicator, XXX, are the file and line number arrived at in the program after executing the previous debug command (C2) and 5 is the total number of bytes in a history point record. A history point record, like the file name record, is a record not input by the user. It is created by the software program after execution of a line in the program under the control of a debug command to provide a traceable path through the program. The tape thus includes records that are debug commands input by the user, such as the B, C, S, W and the like. The tape also includes records that provide information about the program flow that are not input by the user, such as the F and H records which are generated by the program and sequentially placed as needed in the tape.

The next record, another C2, was the third debug command executed by a user. The tape includes additional debug commands, S for a step, W for a watchpoint (record of undetermined length), and T for a trace, as previously listed. Not all possible commands are illustrated in this brief example.

If the number of bytes in the user determined length records are provided in this example, using the byte string from Example 1 and the record breaks from Example 3, the file tape looks as follows:

F7XXXXXXX10/BXXX5/C2/HXXX5/C2/HX-
X5/S2/HXXX
5/F4XXXX7/T2/HXXX5/W16XXXXXXXXXX-
XXXXXX19/S2
/HXXX5/BXXX5/C2/HXXX5/C2/HXXX5/C2/-
HXXX5/T2/
HXXX5/...(Example 4)

In Example 4, the first file name record (the first record in the tape) is a total of 10 bytes, with 7 bytes being the length of the file name record. A 7 follows the F, indicating that there are 7 bytes in the name. A 10 as the last byte indicates that there are a total of 10 bytes in the entire record. The next file name record (the ninth record in the tape) is a total of 7 bytes in length, the name being 4 bytes in length. The watchpoint record (the twelfth record in the tape) is 18 bytes in length, the watchpoint string being 16 bytes in length.

As the user performs debug commands and observes the program responses 240, he will eventually come to an error in the program. At the error, the program response to the debug command will not be proper, a "NO" in step 242. Sometimes, the error will be apparent after the program line containing the error is executed by the debug command, a "YES" in step 244, and the user immediately proceeds to step 256 and modifies the program. If the error is not apparent, a "NO" in step 244, the user must investigate further. The user steps the pointer backward (or forward) along the history tape to a desired history point record on the tape, step 246. (When the history tape is first being created, the pointer is on the most recent history record and remains there until moved by the user.)

Providing the total number of bytes as the last byte in each record permits the pointer to quickly move from record to record. The pointer rests on the first byte of the record it is pointing to. The pointer moves backward through the tape by addressing the last byte in the previous record and then moving that number of bytes. As an example, assume that the pointer is on the last history point in the tape, HXXX5. If the user desires to step the pointer to the previous history point record and execute the debug commands again, the user inputs an "undo" command (one execution step backward through the tape). The computer reads the last byte in the previous history point record, 2, and moves the pointer backward 2 places, ending on the first byte of the previous record. This record is a command record, so the pointer is stepped further backward to the just previous history point record. The "undo" command sets the pointer to the previous history record from the current history record and automatically reexecutes the debug tape on the program. If the user wishes to step backward to any history point along the tape, he may enter a step backward command. The computer reads the last byte in the previous record and moves back the correct number of bytes to rest on the start of the previous history point record in the manner described with respect to the "undo" command. Using this technique, the user may move the pointer backward through the tape. It can be placed on any history point by the user.

To move the pointer forward through the tape, the pointer must move the number of bytes forward, skipping the record. For records having a fixed length, such as a trace, breakpoint, history point, step and the like, the length of the record is read from a table and the pointer moves forward that many bytes to rest on the first byte of the next record. The type of each record is known because the first byte stores the debug command or record type. For records having a variable length, the second byte in each record is the remaining number of bytes, excluding the second byte itself and last byte in that record, thus providing the number of bytes a point should move forward. For example, in the second record, F indicates that it is a file name, whose length is variable so the next bytes are read, a 7, and the pointer is stepped 7+1+ itself bytes forward to {be at} the first byte of the next record. The pointer is thus able to step forward along the tape. Having at least one byte in each record providing the length of the record permits the pointer to quickly step from the first byte in each record to the first byte in a prior or later record.

As an alternative method of moving the pointer, an address could be provided for each record or some other technique used to permit a user to step along the tape. After the user has moved the pointer to the selected history point record of interest, he runs the tape, that is the debug commands are executed a second time on the program, from the beginning of the program the ending pointer by executing the tape of debug commands on the program, step 248. The user has likely moved to the ending pointer to the history point of the line number just prior to the error and hence the debug command execution will end in the general area as the error, likely one line before the error.

Generally the user will execute additional debug commands, step 250 in the program lines near the error to aid him in positively locating the error. For example, the user may execute a trace debug command, a watchpoint debug command, a breakpoint debug command, an assign debug command, or the like on program lines suspected of containing the error. The tail of the tape is replaced by the new debug commands. That is, all records on the tape after a new debug command entered in step 250 are erased and the new debug commands are added on the tail of the tape as they are executed on the program. The user then examines the program to locate the error, step 254. The user continues to execute various debug commands until he locates the error in the program, step 254. To perform other debug commands, the user may step the ending pointer forward (or backward) along the tape, step 246; execute the tape, step 248; and/or execute new debug commands, as part of step 250, storing them on the tape as in step 252, to aid him in performing step 254, locating the errors. Step 250 thus includes steps 204-250.

Once the program errors are located, the user modifies the program to correct the errors, step 256. The user may execute the program, step 104, to determine if the modification corrected the error, step 106. Alternatively, the user may determine if the modification corrected the error by stepping the pointer forward (or backward) along the tape and/or reexecuting the debug commands on the program by running the tape, step 248. If the program or debug tape execution indicate that the program is executing properly, step 108, and all errors have been corrected, the software program is now ready for market testing and/or selling to the public. If the program still does not execute properly, the user must repeat steps 104-256 to locate the additional errors and/or ensure that the previous modification did, in fact, correct the previous errors.

The recording of history points on the debug tape advantageously aids the user in determining the affect of his modification of the program. The tape has stored, as history point records, the program line reached after each debug command is executed. Each time a debug command is executed by running the history tape, the program line arrived at as a result of each debug command is compared to the program line arrived at when the tape was stored, step 249. If the execution of a debug command stored on the tape causes the program to end on a different line than the line ended on when the same debug command was first executed on the same program line, a "NO" in step 249, the user is alerted by visual display that the program flow has changed, step 251. The user may check his modification to determine if the modification was supposed to change the program flow. Frequently, the changing of the program flow is desired to correct the error. If the modification should not have changed the program flow, and it did, the user is alerted and can take action to properly correct the error. Having a history point record providing the program line number ended on after execution of a debug command thus provides an additional aid in error correction when running the tape on the program.

Figure 4A:
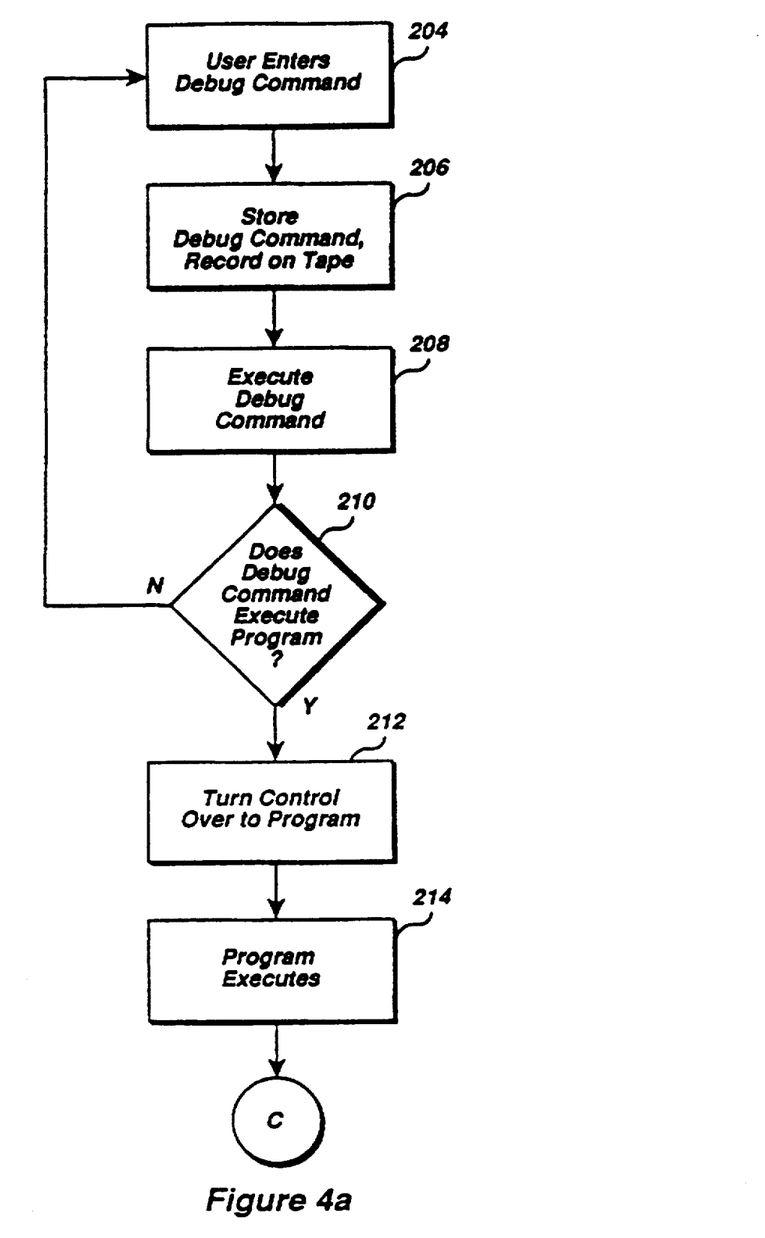
FIGS. 4 and 4b are a detailed flow chart of the record to debug history tape step of the software program of FIG. 2.
Figure 4B:
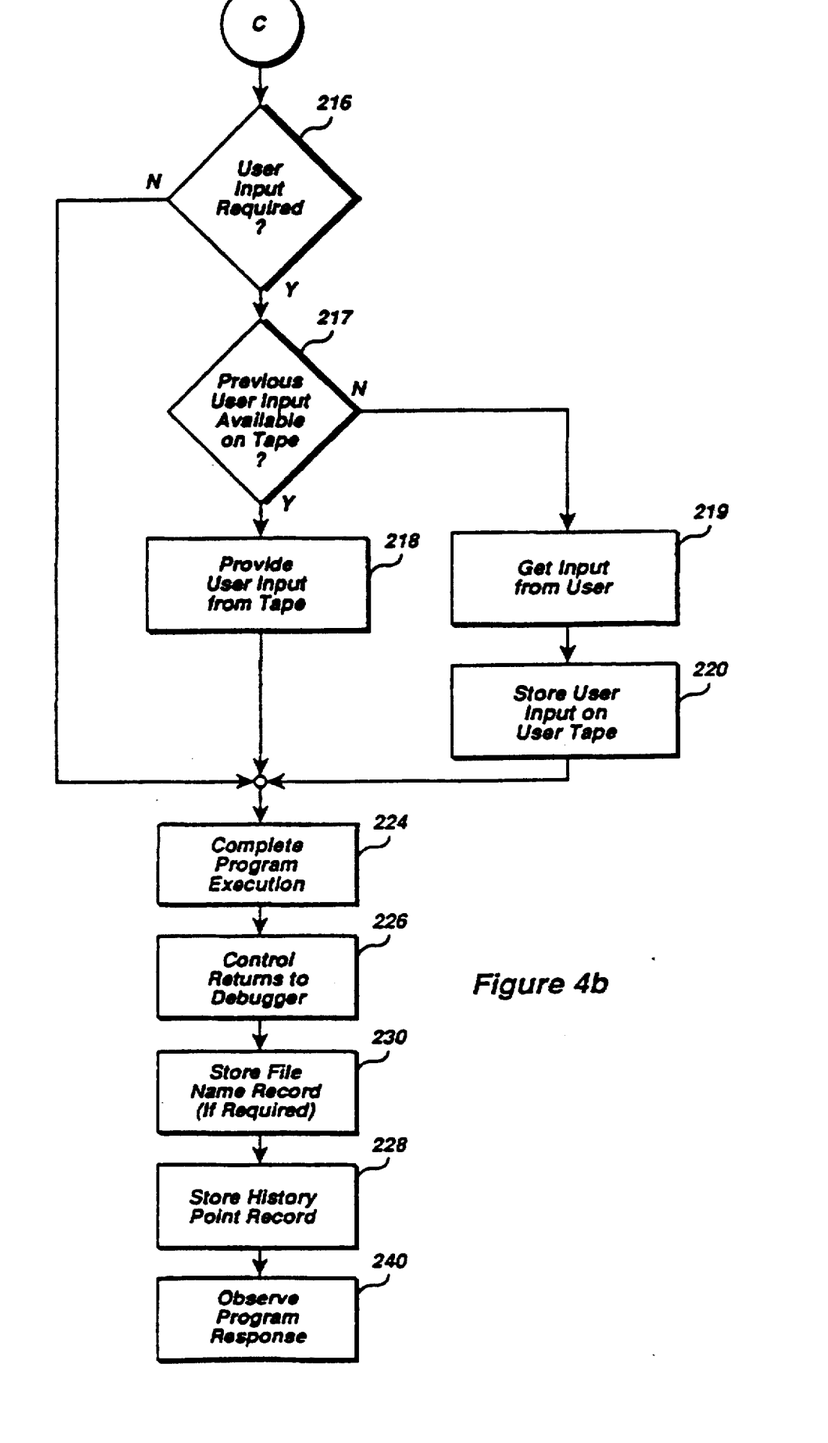

FIGS. 4a and 4b illustrate in more detail step 205 of FIG. 2 recording to the debug history tape. After a user enters the debug command, a record representing that command is stored on the debug history tape. The debug command is then executed, step 208. If the debug command is of the type that does not execute a program line, such as a breakpoint or a watchpoint, the debug command is executed by the debugger, such as marking the appropriate line and control remains with the debugger. The user may then enter a new command, step 204. If the debug command is of the type that executes a program line, step 210, control is turned over to the program, step 212. The program executes as directed by the debug command according to its own program flow, step 214.

If a user-provided input, such as a starting value, is required by the program, a "YES" in step 216, that input must be provided. Some programs ask the user for starting values, fixed values, or other data as part of the program. If the input is not stored on the user tape, a "NO" in step 217, the input is obtained from the user, step 219. The user input value is stored on a user tape, step 220. The user tape is separate from, but similar to, the debug history tape. The values input by the user are sequentially stored on the user tape. When the debug tape is run, the values stored on the user tape are provided at the appropriate program prompts, obviating the need for the user to input the values again. If the input is stored on the history tape, a "YES" in step 217, the input is retrieved from the tape, step 218, and provided to the program. The program completes its execution, step 224.

If the program execution does not require a user input value, the program execution continues, step 224. After the program execution directed by the debug command is completed, control of the processor returns to the debugger, step 226. If a new file name is encountered or an index is being built, a file name record is first stored by the debugger, step 228. The debugger then stores, as a history point record, the line number arrived at by the program, step 230. The user observes the program response to determine if it is proper, step 240, previously described with respect to FIG. 2.

The line numbers in history point records are updated if the line numbers in the program change. Adding or deleting a line in the program are types of modifications to the program. If a line is added in a "C" program, the line numbers of all following lines in the program automatically increases by one. The line numbers stored in the debug records now refer to different lines. To accommodate this change, all following line numbers in debug records are incremented by one so that they still refer to the same logic program line, even though the absolute line number has changed. As more lines are added, the appropriate debug record line numbers are incremented. Deletion of lines causes the line numbers in the debug records to be decremented.

If a line is deleted and a history record contained the number of that line as an ending point arrived at after a debug command, correction is made to the tape. The history point record is modified to indicate that the line corresponding to that line number no longer exists. The line numbers of all following lines in the program decrease by one when a line is deleted, therefore the line numbers referred to in the following history point records are decremented by one. The history points continue to refer to the same logical line in the program, even though the number has changed.

The user tape is a time-saving, and often a labor saving, feature of this invention. Depending on the program, the user may or may not be required by the program to input data. If the debug command executes a line that requires a user provided input, the user is requested only once to provide this input. The user-provided inputs are stored on the separate, user input tape. When the debug tape is executed, causing reexecution of the program, the required input values are read from the user input tape and the user does not need to provide the values again. The user is assured that the same values are input each time the program is run, thus reproducing the debug procedures exactly. The user is saved the time and trouble of inputting the values repeatedly.

Figure 5:
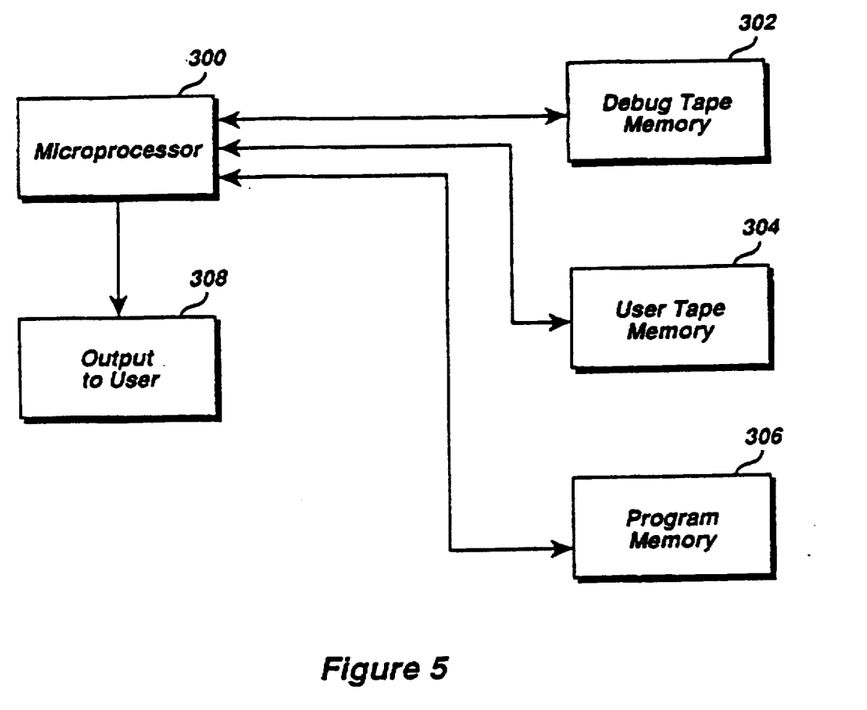
FIG. 5 is a block diagram of an apparatus for carrying out this invention.

FIG. 5 illustrates an apparatus for practicing this invention. A microprocessor 300 is coupled to a debug tape memory 302, a user tape memory 304 and a program memory 306. The microprocessor is also coupled to an output device 308 for providing an output to a user, step 240 of FIG. 2. The output device 308 is a video display, a printer or any other output device.

A program written by a user is stored in the program memory 306. The microprocessor executes lines of the program stored in the memory 306 in a manner well known in the art. When a user enters a debug command, step 204, the debug command is stored as a record in the debug tape memory 302. The debug history tape as previously described herein is stored in the tape memory 302. A plurality of records are stored in the tape memory 302 to form the debug history tape. If a user input is required by the program, the user input is stored in the user tape memory 304.

During execution of the tape on the program, step 248 the tape is read by the microprocessor 300 from the tape memory 302 and the commands on the tape are then executed. If the debug command is of the type that causes execution of a program line, the program line stored in the program memory 306 is executed by the microprocessor 300. The execution of each debug command and program line is displayed to the user on output device 308. Known devices are suitable for use for components 300-308. For example, the microprocessor may be any from the iAPx series family by Intel, including the 8086, 80286, 80386 or the like. A DRAM, floppy disk or hard disk is a suitable memory device for the memories 302, 304 and 306.

The invention is especially useful on complex or iterative programs. As explained in the background of the invention, some programs perform numerous iterations through one or more loops based on different variables. The first few times (or thousands of times) the program steps through the loop, execution may proceed seemingly smoothly because the variables are within an acceptable range of values. However, one variable may get an unacceptable value on the tenth (or one thousandth) iteration of the loop, creating an error and causing the program to crash. Locating such an error is significantly easier with this invention. As steps are taken to correct this type of error, the debug tape can be run on the program many times as the variables change to permit a user to observe the response through the loop. The user need enter each debug command for a line only once. Running the debug tape to reexecute the debug commands in the same sequence each time saves considerable time and effort. By moving the pointer to different records in the tape, the user is able to execute the same debug commands to a selected point, stopping just before or just after a critical line or change in variable value to aid him in debugging the program. Having a user input value tape saves the user the need to input values each time the debug tape is run. Locating additional errors in the program is significantly easier because the debug commands for program lines previously debugged need not be entered again.

We claim:

1. A method of locating and correcting errors in a software program, comprising:
   (a) inputting a software program into a computer;
   (b) executing a debug command on a line in said program
   (c) storing said debug command as a record on a debug history tape;
   (d) repeating steps (b) and (c) a plurality of times to create a debug history tape of said debug commands and said line numbers;
   (e) executing said stored debug commands by running said debug history tape on said program; and
   (f) outputting a visual display to a user indicating the line in said program being executed by said debug commands as they are executed a second time.

2. The method according to claim 1 wherein said debug command is an execution debug command of the type that causes execution of a line in the program and further including the step of:
   storing the line number of said program that is reached in said program after said execution debug command is executed, said line number being stored in a history point record on said debug history tape.

3. The method according to claim further including the steps of:
   (a) setting an ending pointer on a debug history record; and
   (b) executing said stored debug commands by running said debug history tape on said program from said debug history tape's beginning to said ending pointer.

4. The method according to claim 3 wherein each record includes at least one byte indicating the total number of bytes in said record.

5. The method according to claim 2, further including the steps of:
   (a) comparing said line number arrived at in the execution of said stored debug command with the line number arrived at in a prior execution of said same debug command; and (b) outputting a visual indication to a user if the subsequent line number is not the same as the prior line number.

6. The method according to claim 3 wherein said ending pointer is moved from one record in said history tape to a second record in said history tape by stepping it forward or backward along said tape one history point record at a step.

7. The method according to claim 6 wherein said ending pointer steps from one debug command to a different debug command by examining the number of bytes in a debug record and moving that many bytes along the debug history tape to arrive at the beginning byte of a debug history point.

8. The method according to claim 1, further including:
modifying said program to alter its execution; and
executing said stored debug commands on said modified program by running said debug history tape on said program.

9. A method of recording debug steps to aid a user in locating and correcting errors in a software program, comprising:
(a) inputting a software program into a computer, said software program having numbered lines and an inadvertent error in one of said lines;
(b) executing said program until said error halts proper execution;
(c) executing a debug command on a line in said program;
(d) storing said debug command as a record in a debug history tape;
(e) storing the line number in said program that is reached after said debug command is executed, said line number being in a history point record in said tape;
(f) repeating steps (b)-(e) a plurality of times to create a debug history tape having said records;
(g) setting an ending pointer in said debug history record corresponding to the general region in said program containing said error;
(h) executing said stored debug commands on said program by running said commands stored in said debug history record on said program from said beginning pointer to said ending pointer;
(i) locating said error in said program;
(j) modifying said program in an attempt to correct said error; and
(k) executing said program after modifying said program to determine if said error has been eliminated.

10. The method according to claim 9, further including the steps of:
(a) comparing a line number reached following execution of a debug command from said tape with the line number reached following the execution of said same debug command when first executed on said program; and
(b) outputting an alarm signal if said line numbers are not the same.

11. The method according to claim 9 wherein each of said history records includes an indication of the type of record.

12. The method according to claim 11 wherein each of said records includes as a last byte an indication of the total number of bytes in said record.

13. The method according to claim 9, further including:
(a) moving said ending pointer to a different point in said history record; and
(b) executing said stored debug commands on said program by running said commands stored in said debug history record on said program from said tape's beginning to said ending pointer.

14. The method according to claim 9, further including:
displaying as an output to the user the line being executed in said program by said debug command simultaneously with executing said debug command.

15. The method according to claim 9, further including:
(a) storing said inputs provided by said user in a user tape; and
(b) reading said inputs from said user tape when executing said stored debug commands on said program so that the user does not need to provide said inputs during subsequent execution of said program by said debug history tape; and
(c) requesting data inputs from a user when executing a debug command on said program, said data inputs being used to execute a program step.

16. The method according to claim 9, further including:
adding or deleting a line from said program to change the number for subsequent lines in said program; and
changing the line number in said tape to correspond to the same line in said program having a new number.

17. A method of locating and correcting errors in a software program, comprising:
(a) inputting a software program into a computer;
(b) executing a plurality of debug commands on said program;
(c) storing said plurality of debug commands to generate a debug history tape;
(d) outputting as a display to said user a program line being executed by each of said debug commands as they are executed;
(f) executing said stored debug commands a second time by running said debug history record on said program; and
(g) outputting as a display to said user a program line being executed by each of said debug commands as they are executed a second time.

18. An apparatus for executing debug commands from a debug tape memory, comprising:
a microprocessor means for executing program lines of a software program and debug commands;
a program memory means electrically coupled to said microprocessor means for storing executable program lines;
a debug tape memory means electrically coupled to said microprocessor means for storing debug commands executable on said program lines, said electrical coupling permitting said microprocessor to execute said stored debug commands on said program lines; and
an output means electrically coupled to said microprocessor means for indicating to a user when said debug command from said memory is executed on said program line.

19. The apparatus according to claim 18, further including a user input memory means that is addressable by said microprocessor means for storing values input by a user for use in said program lines.

* * * * *